US008214241B2

(12) United States Patent
Kaiser

(10) Patent No.: US 8,214,241 B2
(45) Date of Patent: Jul. 3, 2012

(54) SYSTEM AND METHOD FOR WEB-BASED CUSTOMER CHECK-IN

(76) Inventor: Peter Kaiser, Edina, MN (US)

( * ) Notice: Subject to any disclaimer, the term of this patent is extended or adjusted under 35 U.S.C. 154(b) by 799 days.

(21) Appl. No.: 11/974,074

(22) Filed: Oct. 11, 2007

(65) Prior Publication Data

US 2009/0055208 A1 Feb. 26, 2009

Related U.S. Application Data

(60) Provisional application No. 60/965,358, filed on Aug. 20, 2007.

(51) Int. Cl.
*G06Q 10/00* (2012.01)
(52) U.S. Cl. .................. 705/7.13; 705/7.11; 705/7.12
(58) Field of Classification Search .............. 705/1, 1.1, 705/300–301
See application file for complete search history.

(56) References Cited

U.S. PATENT DOCUMENTS

| | | | |
|---|---|---|---|
| 6,023,681 A | 2/2000 | Whitt | |
| 6,829,583 B1 | 12/2004 | Knapp et al. | |
| 6,845,361 B1 | 1/2005 | Dowling | |
| 6,961,418 B1 | 11/2005 | Thygeson et al. | |
| 7,188,073 B1 | 3/2007 | Tam et al. | |
| 7,768,395 B2 | 8/2010 | Gold | |
| 2002/0073012 A1* | 6/2002 | Lowell et al. | 705/37 |
| 2005/0080675 A1 | 4/2005 | Lovegreen et al. | |
| 2005/0080676 A1* | 4/2005 | Lovegreen et al. | 705/15 |
| 2005/0090951 A1* | 4/2005 | Good | 701/29 |
| 2005/0200455 A1 | 9/2005 | Veni et al. | |
| 2006/0229928 A1* | 10/2006 | Nix, Jr. | 705/9 |
| 2006/0277550 A1* | 12/2006 | Williams et al. | 718/107 |
| 2007/0250355 A1* | 10/2007 | Leet et al. | 705/5 |
| 2008/0103843 A1* | 5/2008 | Goeppert et al. | 705/7 |
| 2008/0133283 A1 | 6/2008 | Backer | |
| 2010/0302027 A1 | 12/2010 | Gold | |

OTHER PUBLICATIONS

The Spa/Salon Manager, http://www.spasalon.com, undated but at least before Aug. 20, 2007.
Best for Cheap and Chic Chops, CUT, Time Out London, undated but at least before Aug. 20, 2007.
Salon Master, http://www.salonmaster.com, undated but at least before Aug. 20, 2007.

* cited by examiner

*Primary Examiner* — Candice D Carter
(74) *Attorney, Agent, or Firm* — Patterson Thuente Christensen Pedersen, P.A.

(57) ABSTRACT

A web-based system and method allows customers to remotely check-in to a wait list for a service from a business. A website is provided through which an address submitted by the customer can be received. Multiple locations of the business in the vicinity of the address and wait times for the service at each location can then be geographically displayed. A selection of a location at which to receive the service can be received and the customer can then be placed on a waiting list for the selected location. The multiple locations can be displayed on a map showing the relative proximity of the address and the locations. The wait times can be calculated using historical data related to the performance of the service at each location, such as the amount of time that employees at the location have taken to perform the service in the past.

26 Claims, 7 Drawing Sheets

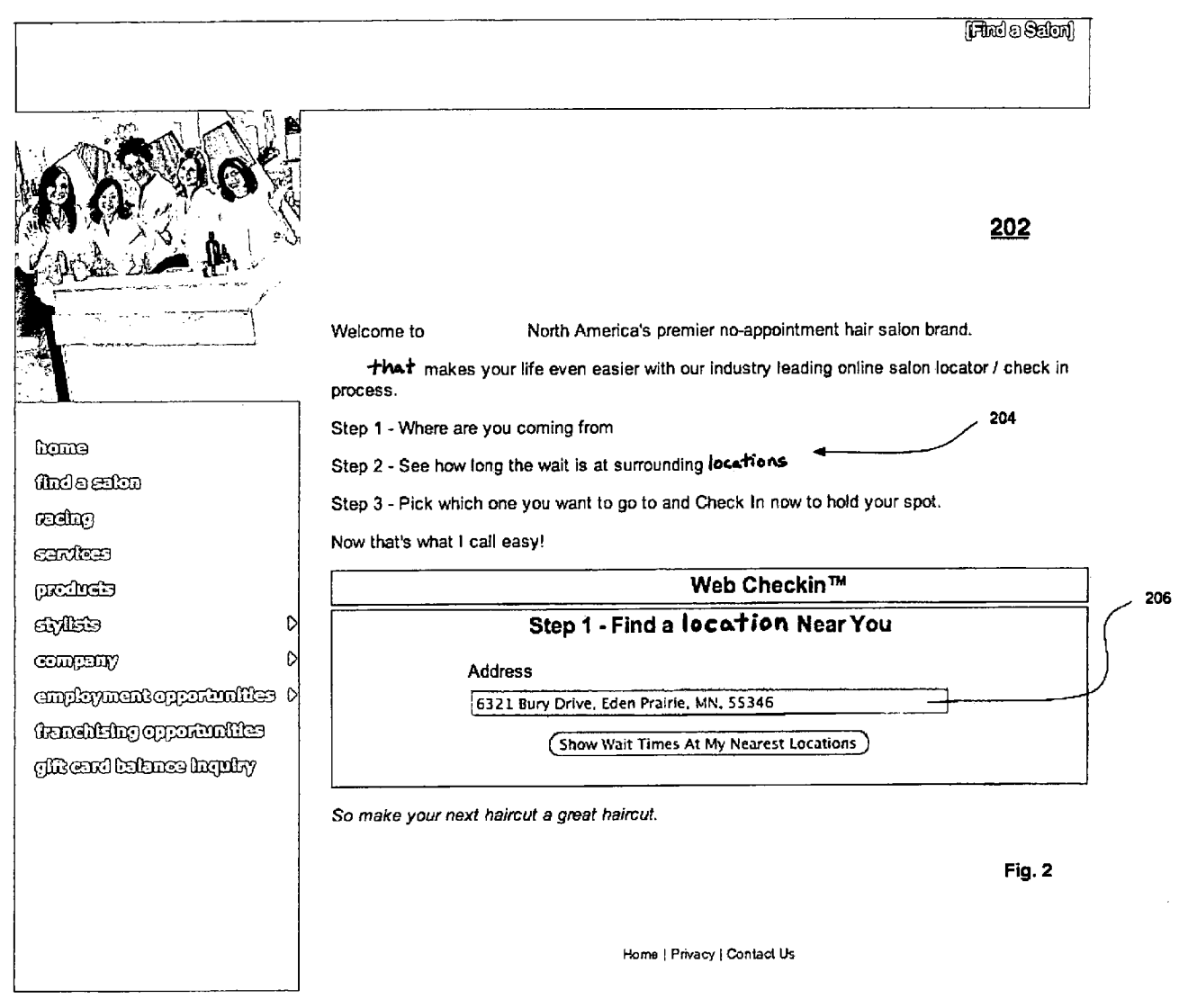

[Find a Salon]

202

Welcome to _____ North America's premier no-appointment hair salon brand. That makes your life even easier with our industry leading online salon locator / check in process.

Step 1 - Where are you coming from
Step 2 - See how long the wait is at surrounding locations ← 204
Step 3 - Pick which one you want to go to and Check In now to hold your spot.

Now that's what I call easy!

Web Checkin™

Step 1 - Find a location Near You

Address

[6321 Bury Drive, Eden Prairie, MN, 55346] ← 206

(Show Wait Times At My Nearest Locations)

So make your next haircut a great haircut.

home
find a salon
racing
services
products
stylists
company
employment opportunities
franchising opportunities
gift card balance inquiry Home | Privacy | Contact Us

Fig. 2

SYSTEM AND METHOD FOR WEB-BASED CUSTOMER CHECK-IN

PRIORITY CLAIM

The present application claims priority to U.S. Provisional Application No. 60/965,358, filed Aug. 20, 2007, which is herein incorporated by reference in its entirety.

FIELD OF THE INVENTION

The present invention relates generally to a web-based customer check-in system and method and more particularly to a web-based customer check-in system and method that provides customers with more accurate estimated wait times for services at a plurality of locations shown on a map-based geographical display in real time.

BACKGROUND OF THE INVENTION

Many businesses, such as no-appointment hair salons, offer services to customers on a first-come, first-served basis and do not accept appointments. Because of this, customers typically do not know how long of a wait it will be to receive a desired service until arrival at the business location. If the wait is too long, the customer may decide to forego the service altogether. Although the customer can call ahead to learn an estimated wait time, many businesses do not allow a customer to have the customer's name put on the wait list until the customer enters the store. In addition, some businesses have numerous locations situated relatively near each other to which a customer has the option of going. However, a customer cannot practically determine which location will be able provide the desired service the soonest, as this would entail visiting each location or making numerous phone calls to inquire about each location's wait time. In addition, the wait times customers receive are simply guesses by the employees typically based solely on the number of customers currently on the waiting list. Due to variations in the time it takes different employees to perform different services, such guesses are usually grossly inaccurate.

SUMMARY OF THE INVENTION

A web-based customer check-in system and method allows customers to view estimated wait times at a plurality of service providing locations in order to select a location to visit based on the most convenient location and the best estimated wait time for the customer. A customer first enters an address into a web page of the business providing the service locations. A map based graphical display of service locations within the vicinity of the entered address and an estimated wait time to have the requested service performed at each location are then presented to the customer. The customer can then select a desired location to be placed on the location's waiting list. When the customer's place on the waiting list is confirmed, the customer can also receive directions from the entered address to the selected location.

BRIEF DESCRIPTION OF THE FIGURES

The invention may be more completely understood in consideration of the following detailed description of various embodiments of the invention in connection with the accompanying drawings, in which:

FIG. 2 is a screenshot of a welcome page of a web-based customer check-in system according to the present disclosure.

Figure 1:
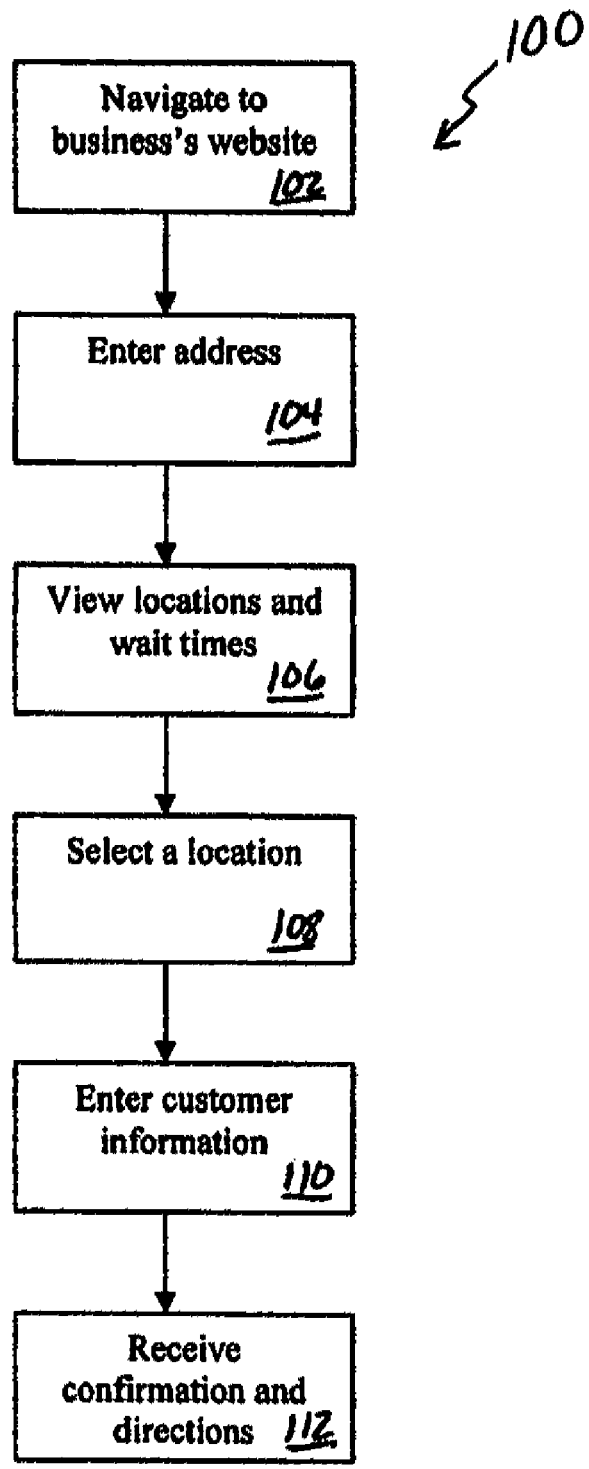
FIG. 1 is flowchart of steps taken by a customer to join a waiting list using a web-based customer check-in system according to the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

FIG. 1 depicts the steps 100 taken by a customer to use a web-based customer check-in system according to the present disclosure. Initially, the customer accesses the internet and navigates to a business's website to access its web-based customer check-in welcome page 202, depicted in FIG. 2, at step 102. The welcome page 202 can provide instructions 204 regarding the operation of the web-based customer check-in system for new customers. At step 104, the customer can enter an address into a text box 206 on the welcome page 202 so that the system can locate service locations of the business near the address. The address can be the customer's home, office, or any other reference address from which the customer wishes to find nearby service locations.

Figure 3:
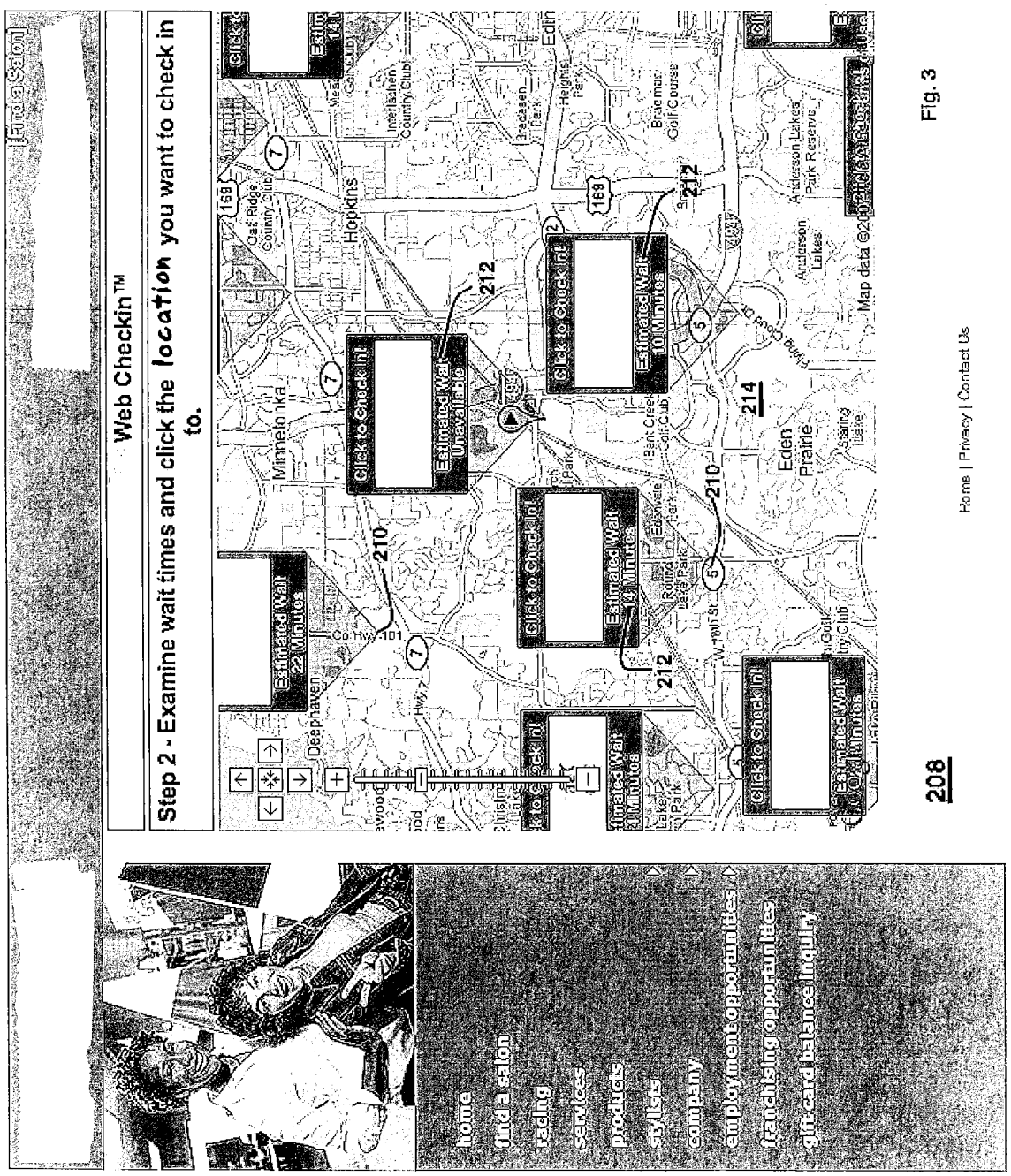
FIG. 3 is a screenshot of a wait time display page of a web-based customer check-in system according to the present disclosure.

After the customer has entered an address, the system displays the nearest locations 210 and estimated wait times 212 at each location 210. The customer can view the results on a wait time display page 208, depicted in FIG. 3, at step 106. Alternatively, the wait time display page 208 can automatically be displayed when a customer searches for the service or the business in a search engine, such as Google™. The business locations 210 displayed can be determined based on a designated number of locations or based on all locations within a certain distance of the entered address, such as, for example, 10 miles. Locations can alternatively be displayed based on wait times, such as, for example, all locations within a certain distance whose wait times are under 20 minutes. The locations 210 can be displayed graphically on a map 214 showing each location 210 relative to each other and the entered address. The graphical display can utilize, for example, Google™ Maps.

Figure 7:
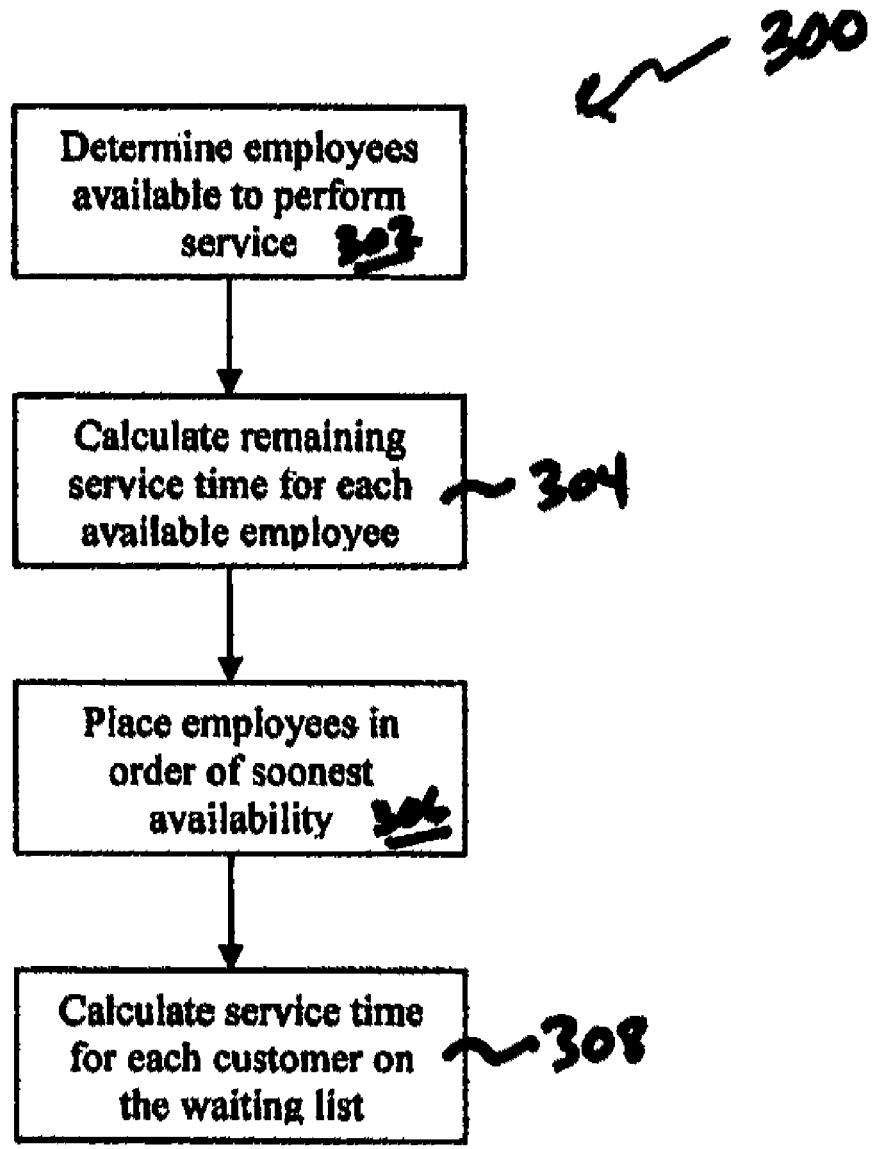
FIG. 7 is a flowchart of steps taken according to a wait time algorithm according to the present disclosure.

Estimated wait times can be determined according to the steps 300 of a wait time algorithm, as shown in FIG. 7. The algorithm first determines which employees of the business are currently available to perform services at the location at step 302. This can be done by having the employees "clock in" when they are working and having them "clock out" when their shifts are over or they go on break. Next, the remaining service time for each employee who is currently serving a customer is calculated at step 304. This calculation is estimated by first averaging historical service times for the particular employee performing the service based on the type of service performed and other relevant factors in the industry, such as, for example, the sex of the customer in the hair salon industry (because services performed on females typically take longer than similar services performed on males due to average hair length). The remaining service time is then calculated by subtracting the elapsed time for the service from the total estimated service time. After estimating the remaining service time for each employee, the employees are placed in order of soonest availability to serve another customer at step 306. Employees who are not currently serving a customer are therefore at the top of the list. Service time is then calculated for each customer on the waiting list at step 308. This is done by pairing the first customer on the waiting list with the first available employee and determining the estimated service time for the employee to perform the particular service for the particular customer. That service time is then added to that employee's total remaining service time and the list of available employees is reordered. This process is repeated for each customer on the waiting list and for each new customer who joins the waiting list. The wait time for each customer joining the waiting list is the shortest remaining service time for an active employee.

The above wait time calculation can be done continuously, or performed at regular intervals, so the wait time is always up-to-date. Changes that are taken into account in updating the wait time include: customers getting served (moving from the wait list to the service list), services being completed for customers, customers' desired service getting changed, customers leaving before being served, employees leaving and/or returning based on shift times and breaks, and services moving closer to completion as time elapses. If an employee is serving more than one customer at a time, then only the longest service time is considered in the calculation. The algorithm can also take into account customers who appear to have left the store by removing those customers from the calculation. If a customer should have been served (there was an employee available and the customer was the next one in line), but was not, the customer can be excluded from the calculation after a predetermined period, such as, for example, ten minutes. The calculation can also ignore employees who appear to be absent or otherwise unavailable. If an employee is clocked in and customers are waiting, but the employee is not serving any customers, the employee can be excluded after a predetermined period.

The wait time at each location can therefore be calculated in a statistically significant manner based on measured historical data. This is in contrast to the "gut-feeling" type of wait time typically given based solely on the number of customers ahead on the waiting list. Calculating wait times based on historical data allows customers to receive more accurate wait times. The historical data can be updated each time an employee performs a service, thereby constantly improving the accuracy of the wait time predictions.

Figure 4:
FIG. 4 is a screenshot of a customer information page of a web-based customer check-in system according to the present disclosure.

Upon viewing the various wait times at nearby locations, the customer can select a location at which the customer wishes to be placed on the waiting list at step 108 by clicking on a location on the map. To be placed on the waiting list, the customer enters information 218 into a customer information page 216, shown in FIG. 4, at step 110. The information 218 can include, for example, the customer's name, phone number, service requested, and the number of guests requesting services. Once the customer has submitted the requested information, the customer is placed on the location's waiting list. Thus, the customer need not physically arrive at the location to be placed on the waiting list. Once the customer is placed on the waiting list, the wait time algorithm automatically adjusts the estimated wait time for the location for subsequent customers using the system.

Figure 5:
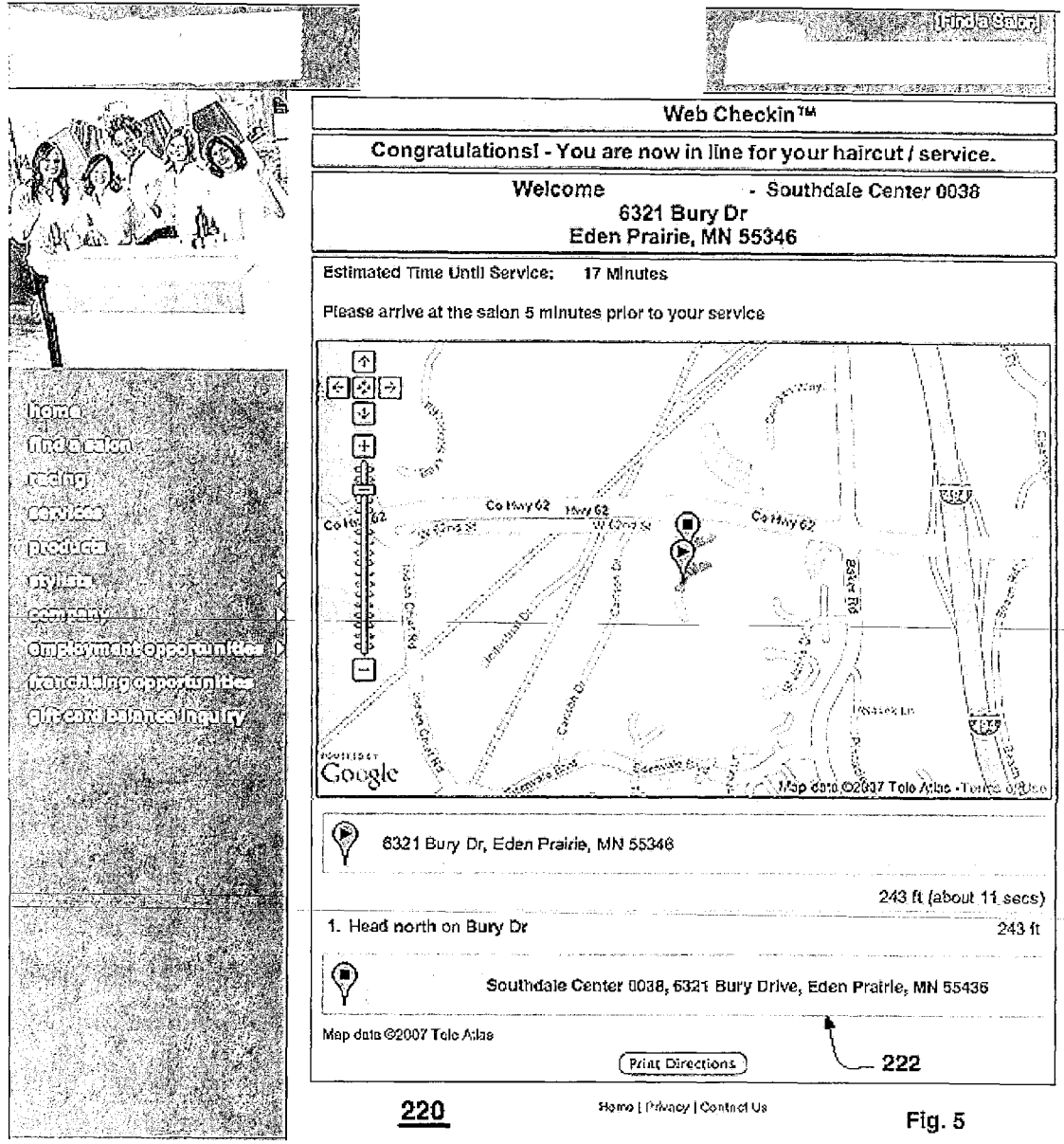
FIG. 5 is a screenshot of a confirmation and directions page of a web-based customer check-in system according to the present disclosure.

The customer can receive a confirmation that the customer has been placed on the waiting list for the selected location on a confirmation page 220 at step 112. The confirmation can also include driving directions 222 from the entered address to the location, as depicted in FIG. 5. Alternatively, the customer can be provided with an option of receiving directions from the confirmation page. The customer can now travel to the location and receive the requested service. Web-based customer check-in system therefore provides customers with the ability to select the location that will minimize the customer's wait time. The wait time is further minimized because the customer can be placed on the waiting list before arriving at the location, allowing the customer's travel time, which must take place anyway, to reduce the wait time.

Figure 6:
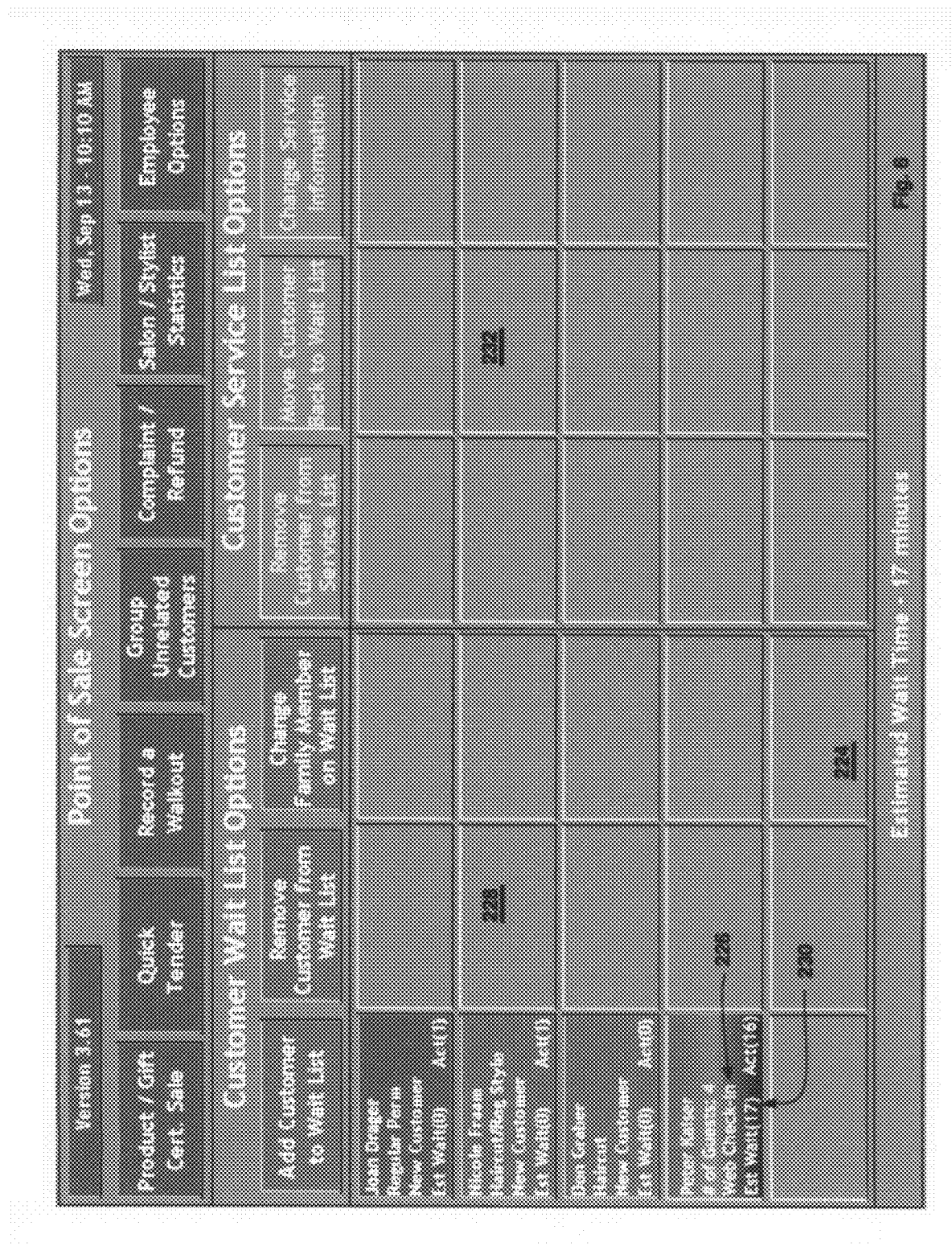
FIG. 6 is a screenshot of a store interface of a web-based customer check-in system according to the present disclosure.

When a customer checks in for a service via web-based customer check-in, the customer's entered information will appear on the business location's store interface 224 as shown in FIG. 6. Web check-in customers can be separately identified from walk-in customers through text 226 and/or graphics (i.e., a differently colored box). Web check-in customers join the waiting list 228 in the order of check-in with walk-in customers. An estimated wait time 230 can be displayed for each customer on the waiting list 228. A running overall estimated wait time incorporating both walk-in customers and web customers can be displayed on the store interface 224 to be given by employees to any walk-in customers who enter and wish to know what the wait time is. When a web check-in customer arrives at the store, the customer's information and requested service received from the web-based check-in can be confirmed by an employee. Once the customer is called to receive the customer's requested service, the customer is transferred from the wait list 228 to a service list 232 and each customer on the wait list 228 moves forward in the queue. The time that each customer has spent on the wait list 228 and on the service list 232 can also be displayed on the store interface 224. When a customer's service has been completed, the customer is removed from the service list 232.

Web-based customer check-in system and method can be used by any business that provides services to customers on a first-come, first-served basis. The system and method are designed for use with no-appointment business; it is not a web-based appointment scheduling system and method. It can be most advantageously employed by businesses providing such services at numerous locations that are situated relatively near each other from which customers may choose to visit. One type of business for which the disclosed system and method are particular well suited is no-appointment hair salon chains. A customer seeking a haircut, perm, or other service can remotely access the chain's website and enter the wait list at whichever nearby salon can provide the desired service at the most convenient time for the customer. This can significantly reduce the time a customer would otherwise spend sitting in the no-appointment salon's waiting room. The wait times given to customers are also much more accurate because they are based on measured historical data, which reduces the likelihood of customers arriving undesirably early or late for their requested services.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention.

The invention claimed is:

1. A method of providing internet-based, map based, customer check-in for customers desiring a service from a business, comprising:
   providing an internet-based interface associated with the business;
   receiving a location associated with a customer by way of the internet-based interface;
   displaying to the customer multiple locations on a map of the business in the vicinity of the location associated with the customer;
   displaying estimated wait times on the map for the service based on a no-appointment, first listed-first served waiting list at each displayed location;
   receiving a customer selection of a location on the map at which to receive the service;
   placing the customer on the waiting list inside a physical location of the business corresponding to the location selected on the map by the customer; and
   transferring information about the customer to the selected location,
   wherein the step of displaying estimated wait times includes using a computer processor to calculate the wait time at each location using historical data related to the performance of the service at the location, the historical data including a separate amount of service time that each of a plurality of specific employees at the location have taken to perform the service in the past; and
   wherein the wait time is calculated at each location by:
      determining which employees of the business are currently available to perform services at the location;
      calculating a projected remaining service time for each employee currently serving a customer by averaging historical service times for the particular employee performing the particular service and subtracting an elapsed service time from the historical service time;
      placing the employees in order of projected soonest availability based on the projected remaining service time;
      matching the first employee projected to be available with the first customer on the waiting list and calculating a projected service time for that employee to provide a requested service for that customer based on average historical service times, adding the calculated projected service time to the employee's projected remaining service time, and reordering the employees in order of projected soonest availability; and
      matching each subsequent customer on the waiting list with a particular employee projected to be available when that customer is projected to be first on the waiting list based on historical service times, and calculating a projected service time for that employee to provide a requested service for that customer based on average historical service times for that employee until each customer on the waiting list is matched with a particular employee, wherein the wait time displayed is the smallest remaining total projected service time for an employee after each customer on the waiting list has been matched to an employee.

2. The method of claim 1, wherein the multiple locations are displayed on the map showing the relative proximity of the location associated with the customer and the multiple locations.

3. The method of claim 1, wherein the wait times are continuously updated.

4. The method of claim 1, wherein the business is a no-appointment hair salon.

5. An internet-based customer check-in system for customers desiring a service from a business, comprising:
   an internet-based interface configured to receive a location associated with a customer, display multiple locations of the business in the vicinity of the location associated with the customer on a map, and receive a customer selection made on the map of a location at which to receive the service;
   software configured to calculate estimated wait times for the service based on a no-appointment, first listed-first served waiting list at each displayed location to be displayed on the map on the interface, the estimated wait time at each location being calculated using historical data related to the performance of the service at the location, the historical data including a separate amount of service time that each of a plurality of specific employees have taken to perform the service in the past, wherein the wait time at each location is calculated by matching each customer on the waiting list with a specific employee projected to be first available when the particular customer is first on the waiting list based on historical services times of the specific employees and utilizing historical data of each specific employee to calculate a projected service time for each customer on the waiting list to determine a total projected service time for each employee, and the wait time is the smallest remaining total projected service time for an employee; and
   a computer at each location in communication with the website configured to display the waiting list for the location, wherein customers who enter the waiting list via the map on the website are automatically placed on the waiting list at the location and are served in the order they are placed on the waiting list and as customers receive services they can be removed from the waiting list via the computer.

6. The system of claim 5, wherein customers can also be entered on the waiting list manually via the store's computer.

7. The system of claim 5, wherein the multiple locations are displayed in the map in graphical format showing the relative location of the location associated with the customer and the multiple locations.

8. The system of claim 5, wherein the business is a no-appointment hair salon.

9. A method of providing internet-based, map-based customer check-in for customers desiring a service from a no-appointment hair salon chain, comprising:
   providing an internet-based interface associated with the salon chain;
   receiving a location associated with a customer via the internet-based interface;
   displaying to the customer multiple individual salons of the salon chain in the vicinity of the location directly on a map;
   displaying estimated wait times for the service based on a no-appointment, first listed-first served waiting list at each individual salon on the map;
   receiving a customer selection made on the map of an individual salon at which to receive the service; and
   placing the customer on the waiting list at the selected salon, wherein the step of displaying estimated wait times includes using a computer processor to calculate the wait time at each salon using historical data related to the performance of the service at the salon, the historical data including a separate amount of service time that each of a plurality of specific stylists at the salon have taken to perform the service in the past; and wherein the wait time at each individual salon is calculated by:
  determining which stylists of the salon are currently available to perform services at the salon;
  calculating the remaining service time for each stylist who is currently serving a customer by averaging historical service times for the particular stylist performing the particular service and subtracting the elapsed service time from the historical service time;
  placing the stylists in order of projected soonest availability based on the remaining service time for each stylist;
  matching the first stylist projected to be available with the first customer on the waiting list and calculating the service time for that stylist to provide the requested service for that customer based on average historical service times, adding the calculated service time to the stylist's remaining service time, and reordering the stylists in order of soonest projected availability; and
  matching each subsequent customer on the waiting list with a particular stylist projected to be available when that customer is projected to be first on the waiting list based on historical service times, and calculating a projected service time for that stylist to provide a requested service for that customer based on average historical service times for that stylist until each customer on the waiting list is matched with a particular stylist, wherein the wait time displayed is the smallest remaining total projected service time for a stylist after each customer on the waiting list has been matched to a stylist.

10. The method of claim 9, further comprising providing driving directions from the location to the selected salon.

11. The method of claim 9, wherein the individual salons are displayed on the map showing the relative location of the location and the individual salons.

12. An interne-based method of checking in for a service from a business, comprising:
  accessing an internet-based interface associated with the business;
  providing a location through the interface;
  selecting one business location from a plurality of business locations for the business on a map on the interface at which to receive the service, wherein a wait time for the service is displayed on the map based on a no-appointment, first listed-first served waiting list for each of the plurality of business locations, the wait time for each business location having been calculated with a computer processor using historical data related to the performance of the service at the business location, the historical data including a separate amount of service time that each of a plurality of specific employees have taken to perform the service in the past;
  entering identification information through the interface;
  being placed on the waiting list at the business location; and
  receiving an estimate wait time for receiving the service at the business location, the wait time having been calculated by projecting a particular employee that will be available to perform the service when each customer on the waiting list will be the next to receive the service based on historical service times and utilizing historical data of each specific employee to calculate a projected service time for each customer on the waiting list to determine a total projected service time for each employee, and the wait time is the smallest remaining total projected service time for an employee.

13. The method of claim 12, further comprising receiving driving directions from the location to the selected business location.

14. The method of claim 12, wherein the business is a no-appointment hair salon.

15. The method of claim 1, wherein the service time for the service results primarily from the skill and experience of the specific employee.

16. The system of claim 5, wherein the service time for the service results primarily from the skill and experience of the specific employee.

17. The method of claim 9, wherein the service time for the service results primarily from the skill and experience of the specific stylist.

18. The method of claim 12, wherein the service time for the service results primarily from the skill and experience of the specific employee.

19. A method of providing internet-based, map based, customer check-in for customers desiring a service from a business, comprising:
  providing an interne-based interface associated with the business;
  receiving a location associated with a customer by way of the internet-based interface;
  displaying to the customer multiple locations on a map of the business in the vicinity of the location associated with the customer;
  displaying estimated wait times on the map for the service based on a no-appointment, first listed-first served waiting list at each displayed location;
  receiving a customer selection of a location on the map at which to receive the service;
  placing the customer on the waiting list inside a physical location of the business corresponding to the location selected on the map by the customer; and
  transferring information about the customer to the selected location,
  wherein the step of displaying estimated wait times includes using a computer processor to calculate the wait time at each location using historical data related to the performance of the service at the location, the wait time being calculated at each location by matching each customer on the waiting list with a particular employee projected to be available when that customer is first on the waiting list based on historical service times and utilizing historical data relating to the performance of the service by each of the particular employees to arrive at a projected service time for each customer, and the wait time is the smallest remaining total service time for an employee.

20. The method of claim 19, wherein the multiple locations are displayed on the map showing the relative proximity of the location associated with the customer and the multiple locations.

21. The method of claim 19, wherein the wait times are continuously updated.

22. The method of claim 1, wherein the step of receiving a customer selection of a location on the map at which to receive the service is received by the customer selecting an icon on the map representing the location, wherein the icon includes the wait time for the location.

23. The system of claim 5, wherein the internet-based interface receives the customer selection of the location at which to receive the service by receiving a selection by the customer of an icon on the map representing the location, wherein the icon includes the wait time for the location.

24. The method of claim 9, wherein the step of receiving a customer selection made on the map of an individual salon at which to receive the service is received by the customer selecting an icon on the map representing the salon, wherein the icon includes the wait time for the salon.

25. The system of claim 12, wherein the step of selecting one business location from a plurality of business locations for the business on a map on the interface at which toe receive the service is done by selecting an icon on the map associated with the business location, wherein the icon includes the wait time for the business location.

26. The method of claim 19, wherein the step of receiving a customer selection of a location on the map at which to receive the service is received by the customer selecting an icon on the map representing the location, wherein the icon includes the wait time for the location.

\* \* \* \* \*

UNITED STATES PATENT AND TRADEMARK OFFICE
CERTIFICATE OF CORRECTION

PATENT NO. : 8,214,241 B2
APPLICATION NO. : 11/974074
DATED : July 3, 2012
INVENTOR(S) : Kaiser Page 1 of 1

It is certified that error appears in the above-identified patent and that said Letters Patent is hereby corrected as shown below:

In the Claims:

Column 6, Line 34, replace "website" with "interface"
Column 6, Line 36, replace "website" with "interface"
Column 6, Line 42, replace "store's" with "location's"
Column 7, Line 39, replace "interne-based" with "internet-based"
Column 7, Line 59, replace "estimate" with "estimated"
Column 8, Line 24, replace "interne" with "internet"
Column 9, Line 10, replace "toe" with "to"

Signed and Sealed this
Twenty-third Day of April, 2013

Teresa Stanek Rea
*Acting Director of the United States Patent and Trademark Office*